United States Patent Office 2,854,489
Patented Sept. 30, 1958

2,854,489

CHLORINATED PARAFFINS STABILIZED WITH STYRENE COMPOUNDS

John E. Dereich and Arnold Riihimaki, Painesville, Ohio, assignors to Diamond Alkali Company, Cleveland, Ohio, a corporation of Delaware No Drawing. Application January 10, 1955
Serial No. 481,040

8 Claims. (Cl. 260—652.5)

This invention relates to methods for the stabilization of normally solid highly chlorinated paraffins, and to stabilized compositions of such chlorinated paraffins.

Highly chlorinated hydrocarbons, especially highly chlorinated paraffin waxes containing up to about 80% of chemically combined chlorine, may be prepared in a variety of ways but are most suitably prepared by dissolving the paraffin desired to be chlorinated in a solvent, such as carbon tetrachloride, and then contacting this solution with elemental chlorine, preferably in the presence of catalytically activating light. Upon obtaining the desired chlorination, the carbon tetrachloride solution usually becomes a highly viscous, sticky liquid. Various means may be resorted to, of course, to separate the solvent from the chlorinated paraffin wax, whereupon the chlorinated paraffin is ordinarily obtained as a resin-like solid material, which, in the case of chlorinated paraffins containing from about 65% to 80% of chemically combined chlorine, suitably may be comminuted into powdered form. Such materials have a variety of uses in the arts but are to a considerable extent limited in their applicability by instability at elevated temperatures, presumably arising from the loss of chlorine, apparently only loosely held in the molecules, which is evolved in the form of hydrogen chloride.

Sundry suggestions have heretofore been made for stabilization of highly chlorinated paraffin materials, especially those having from about 40% to 80% of chemically combined chlorine, these suggestions having included the addition of various materials designed to prevent the evolution of hydrogen chloride, whatever the cause may be, from the materials when they are exposed to heat. These prior suggestions, however, have failed of commercial applicability largely because, in fact, the temperature of stability of the chlorinated paraffin was not raised significantly by use thereof.

This invention contemplates a method for materially increasing the temperature stability of highly chlorinated paraffins containing from about 40% to about 80% of chemically combined chlorine, by addition thereto of a stabilizing substance, which addition may take place either in the separation stage of the chlorinated paraffin from its solvent or to the comminuted solid material after it has been separated from the solvent. Thus, the stabilizers of the present invention may be added to a solution of chlorinated paraffin prior to separation of the paraffin from its solvent, as by steam distillation. The stabilizers may also be incorporated in the chlorinated paraffin by flashing the solvent from a hot bath of the stabilizer. The stabilizer may also be added to the solid recovered chlorinated paraffin and thoroughly mixed therewith.

This invention contemplates the use as stabilizers of monomeric substances characterized by the following generic structure:

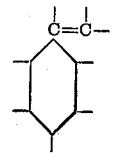

More particularly, monomers of the above type found useful as stabilizers in the practice of the invention include unsubstituted styrene monomer, halogenated styrene monomers, such as fluoro-, bromo-, and chlorostyrene, including mono-, di-, tri-, and other polyhalogenated styrene monomers, e. g., 2,5-dichlorostyrene, as well as other monomeric styrene derivatives. In most applications, it is preferred to employ a monomeric styrene material having a relatively high boiling point, e. g., 145°–146° C. or greater.

As used in the specification and claims, the expressions "styrene monomer," "monomer," and "monomeric materials" are intended specifically to mean substances containing no polymerization catalysts, e. g., peroxide catalysts and the like. Moreover, it will be understood that this invention is directed to the use of monomeric materials only; polymeric substances, for example, substituted and unsubstituted polystyrenes do not share the unique stabilizing ability characterizing the monomeric styrenes.

Materials which may be stabilized in accordance with the present invention include chlorinated paraffins wherein the paraffin may suitably have from 18 to 36 carbon atoms in a straight or branched chain and suitably average of the order of 24 carbon atoms, which paraffins have a melting point of the general order of 48° to 68° C., suitably 51° to 55° C. As noted above, materials of this general character may contain from about 40% to 80% of chemically combined chlorine. When containing upwards of 50–60% of chemically combined chlorine, these chlorinated paraffins are normally solids at conditions approaching normal conditions, and especially where 65% to 75% of chemically combined chlorine is present, these materials are generally solids under ordinary conditions. A particularly suitable member of this class is chlorinated paraffin having from 69% to 71% of chlorine.

The practice of this invention is especially advantageous in stabilizing chlorinated paraffins against thermally-induced decomposition. In most instances, the singularly improved heat-resistant properties of paraffins embodying a stabilizer of this invention are most pronounced when the stabilizer is added in a small but effective amount of up to about 5% by weight of the chlorinated paraffin. It will be recognized, of course, that in certain applications the amount of stabilizer may be varied outside this range, although at present a preferred amount is about 2% by weight.

In addition to the substantial improvement in heat stability, chlorinated paraffins containing stabilizers embodying the invention also are characterized by improved transparency and clarity. This, of course, is highly advantageous when the chlorinated paraffin material is to be employed in the many applications where either a transparent or light-colored product is to be manufactured.

In order that those skilled in the art may more completely understand the present invention and the preferred methods by which the same may be carried into effect, the following specific examples are offered:

Example I

To 50 grams of chlorinated paraffin wax containing about 70% of chemically combined chlorine is added 1 gram of styrene monomer. This mixture is dry blended and heated at a temperature of 205° C. for 45 minutes. The test is duplicated by similarly heating unstabilized chlorinated paraffin wax of the same type. After heating, the sytrene monomer-containing sample is still light-colored and transparent, while the unstabilized sample is substantially black in color with many large fracture lines and streaks therethrough.

Example II

To compare the stabilizing ability of styrene monomer with that of another type of stabilizer, two samples are prepared, one comprising a mixture of chlorinated paraffin wax (70% of chemically combined chlorine) containing 2% by weight of styrene monomer, and the second comprising the same type of chlorinated paraffin wax stabilized with 5% by weight of pentaerythritol. Both of these samples are heated at a temperature of 220° C. for 15 minutes. The styrene monomer-stabilized sample remains clear, while the pentaerythritol-stabilized sample, although exhibiting an improved stability over an unstabilized sample, is considerably darker in color and contains a substantial bubble distribution as compared to the styrene-stabilized sample.

The improved stability of chlorinated paraffin of the general type under discussion may suitably be further demonstrated by submitting the materials to a standard test wherein a 20-gram sample of solid chlorinated material is comminuted and placed in a closed test tube fitted with a gas inlet and an outlet tube and heated to a temperature of 175° C. for a period of four hours, during which time the test tube is constantly swept with a stream of dry nitrogen. During the heating period, the hydrogen chloride evolved from the sample is removed by the current of dry nitrogen and collected in a washing tower of N/10 caustic soda solution. By suitable titration, the amount of HCl evolved may be determined readily. The rating given the material is based upon the percentage of the weight of the sample taken which is recovered as hydrogen chloride.

Chlorinated paraffin containing 70% of chemically combined chlorine and prepared by the method set forth above, and not stabilized in accordance with the present invention, normally has a rating in accordance with the above test of about 0.3%. Such a material is suitable for many uses in the arts where temperatures of the order of 150° C. and higher are not encountered, but when subjected to temperatures in excess of 150° C., as, for example, must be the case in combining chlorinated paraffin with thermoplastic materials which are subsequently to be molded at relatively high temperatures, the chlorinated paraffin is subject to discoloration and degradation and, moreover, discolors the ultimate molding with a plastic, whereby its use in this connection is not indicated.

In contrast to these results obtained on prior art chlorinated paraffins, the method of the present invention produces compositions which have ratings in accordance with the above test as low as 0.09%, average values being about 0.15%. Such materials are found to be stable at temperatures of the order of 230° C. and higher for periods of one-half hour or more without appreciable discoloration or other evidence of degradation. It will be appreciated that since the injection molding temperatures of, for example, polystyrene are normally less than 230° C. and, moreover, since such temperatures are not endured by the material for more than a relatively short period of time, while in the injection molding machine, such stabilized chlorinated paraffins are available for combination with such thermoplastic materials as extenders of the plastic material and particularly as flame-retarding agents in the plastic material, whereby the previously inflammable plastic substance may be rendered substantially flame-retardant; thus, its usefulness in the arts for many purposes not heretofore available is enhanced.

Example III

The procedure of Example I is repeated using, instead of the styrene monomer, a dichloro-styrene monomer. The stability exhibited is superior to that obtained using the styrene monomer.

Example IV

To separate 50-gram samples of chlorinated paraffin (70% by weight of chemically combined chlorine) are added, respectively, 1 gram of styrene monomer, 1 gram of granular polystyrene, and 1 gram of styrene monomer catalyzed with benzoyl peroxide (Luperco ATC). To a fourth control sample nothing is added. These samples are then heated at a temperature of 205° C. for 15 minutes and allowed to cool. The sample to which was added the catalyzed styrene monomer is quite dark in appearance, indicating poor stability. The styrene monomer-containing sample is far less dark, while the polystyrene-containing sample and control sample are substantially identically darkened in appearance, thus indicating no stabilization by the polymeric styrene.

From the foregoing description of the invention it will now be appreciated that the unique stabilizing properties imparted to the chlorinated paraffin wax by the styrene monomer and/or halogenated styrene monomer are not to be considered equivalent to the addition to chlorinated paraffin waxes of polystyrene or of styrene monomers containing any type of curing agent or catalyst.

It will be recognized also that the practice of this invention is not limited to any one particular method of incorporating the stabilizer. Chlorinated paraffin compositions to be stabilized in accordance with this invention may be in the form of solutions, or other liquid form, or as finely-divided solids, the advantageous stabilizing effect being obtained upon addition of the monomer in either case.

It will be appreciated that the increased temperature stability imparted by the stabilizers of this invention renders their use advantageous in a variety of chlorinated paraffin compositions. Accordingly, such chlorinated paraffin compositions may contain, in addition to one or more stabilizers of this invention, other ingredients, such as fillers, pigments, extenders, and/or flameproofing agents, such as antimony oxide.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of stabilizing a chlorinated paraffin containing from about 40% to 80% chemically combined chlorine, said method including the step of adding to said chlorinated paraffin a normally polymerizable monomeric substance having the following structure:

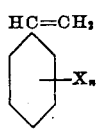

wherein X is a halogen and $n$ is a number from 0 to 5, inclusive.

2. The method of stabilizing chlorinated paraffin containing from about 50% to 80% of chemically combined chlorine, said method including the step of adding to said chlorinated paraffin a small but effective amount of a substance chosen from the group consisting of styrene monomer and a halogenated styrene monomer.

3. The method of thermally stabilizing chlorinated paraffin wax containing from about 69% to 71% of chemically combined chlorine, said method including the step of adding to said chlorinated paraffin a small but effective amount of a substance chosen from the group consisting of styrene monomer and a halogenated styrene monomer.

4. The method of stabilizing chlorinated paraffin wax containing from 50% to 80% of chemically combined chlorine, said method including the step of adding to said chlorinated paraffin wax up to 5% by weight of the chlorinated paraffin wax of a substance selected from the group consisting of styrene monomer and a halogenated styrene monomer.

5. A new composition of matter consisting essentially of a stabilized chlorinated paraffin wax having from 18 to 36 carbon atoms and from 50% to 80% of chemically combined chlorine and up to 5% by weight of a substance selected from the group consisting of styrene monomer and a halogenated styrene monomer.

6. A new composition of matter consisting essentially of a stabilized chlorinated paraffin wax having from 18 to 36 carbon atoms and from 69% to 71% of chemically combined chlorine and up to 5% by weight of a substance selected from the group consisting of styrene monomer and a halogenated styrene monomer.

7. A new composition of matter consisting essentially of a stabilized chlorinated paraffin wax having from 18 to 36 carbon atoms and from 50% to 80% of chemically combined chlorine and up to 5% by weight of styrene monomer.

8. A new composition of matter consisting essentially of a stabilized chlorinated paraffin wax having from 18 to 36 carbon atoms and from 50% to 80% of chemically combined chlorine and up to 5% by weight of a halogenated styrene monomer.

References Cited in the file of this patent

UNITED STATES PATENTS

| | | |
|---|---|---|
| 2,119,873 | Wiezevich | June 7, 1938 |
| 2,377,630 | Hyde | June 5, 1945 |

FOREIGN PATENTS

| | | |
|---|---|---|
| 495,410 | Great Britain | Nov. 14, 1938 |

OTHER REFERENCES

Sachanen: "Conversion of Petroleum," pp. 77, 299–300 (1940).